Nov. 4, 1941.       A. W. PRANCE              2,261,698
              ASH RECEIVER AND LAMP ASSEMBLY
                    Filed June 9, 1938            2 Sheets-Sheet 1
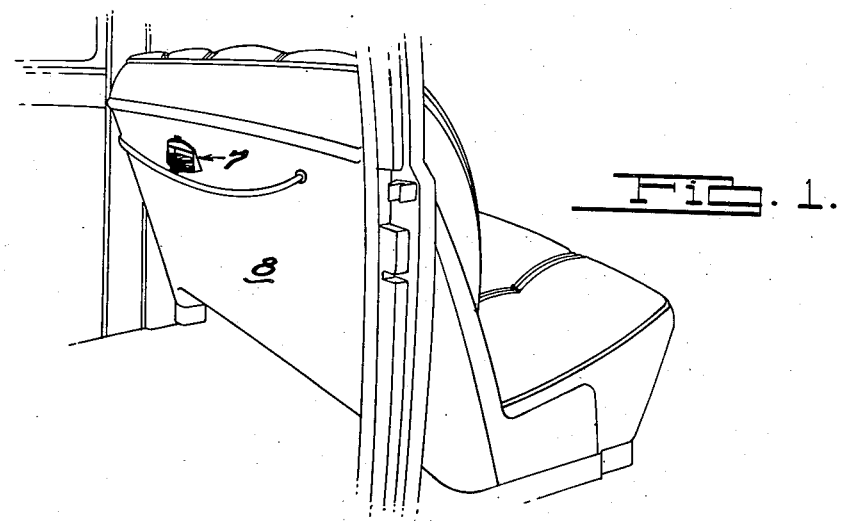
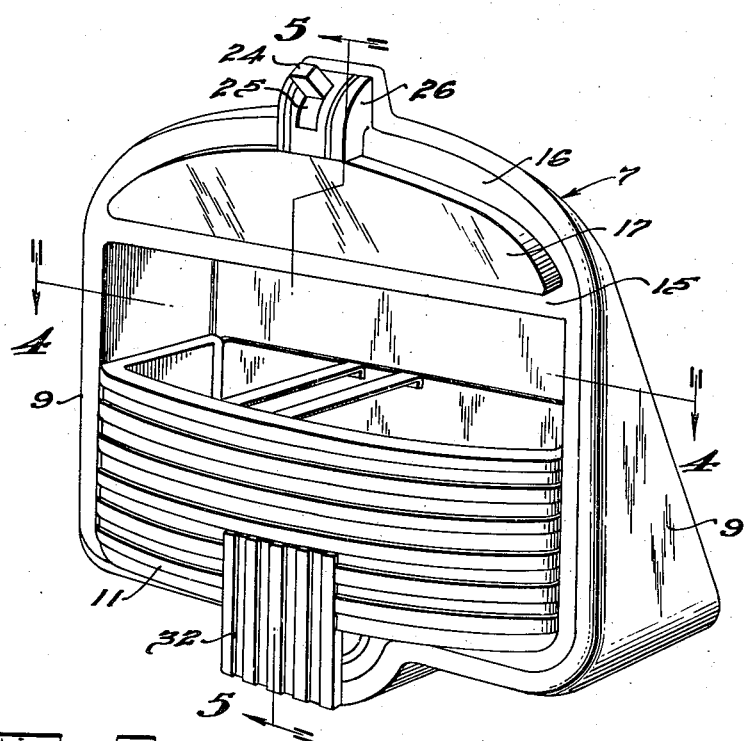
INVENTOR
Alvin W. Prance.
BY Dike, Calver & Gray
ATTORNEYS.

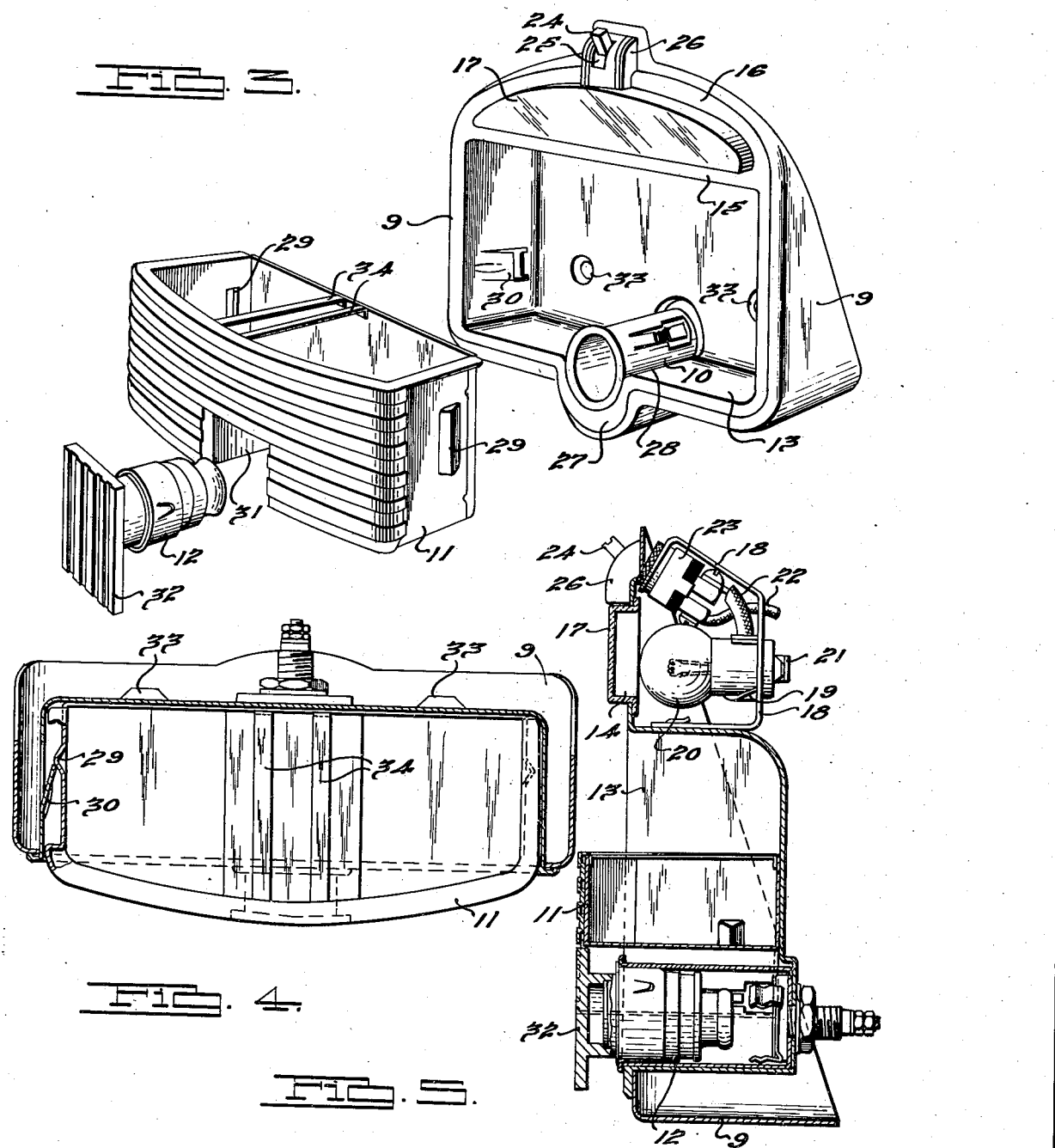

Patented Nov. 4, 1941

2,261,698

UNITED STATES PATENT OFFICE 2,261,698

ASH RECEIVER AND LAMP ASSEMBLY

Alvin W. Prance, Pleasant Ridge, Mich., assignor to Briggs Manufacturing Company, Detroit, Mich., a corporation of Michigan Application June 9, 1938, Serial No. 212,854

8 Claims. (Cl. 131—234)

The present invention relates to an accessory for a motor vehicle adapted especially although not exclusively for use in the interior of an automobile body.

Heretofore, it has been conventional practice to provide in an automobile body some or all of the following appurtenances: a lamp fixture and assembly for the interior of the body, a receptacle, such for example as an ash receiver, and a heat creating unit for lighting purposes, such as a cigarette lighter. However, each of these appurtenances has been installed heretofore as an independent accessory entirely independent from the others in function, operation, structure, and location.

It is a principal object of my invention to obviate the expense, inconvenience and duplication of parts necessitated by the use of the separate appurtenances mentioned above by providing an accessory which combines in one assembly a light source and a receptacle, and preferably provides, in addition, a heat creating unit for lighting purposes.

It is another object of the invention to provide a novel and useful accessory assembly having a common mounting and supporting means for a lamp and an ash receptacle.

Another object of the invention is to provide a vehicle accessory which ensures more ready and convenient access to a receptacle and lighter unit by combining these articles as elements of one assembly and to further add to the convenience and the comfort of an occupant of a vehicle body by providing a lamp integrally associated therewith.

It is a further object of the invention to provide an accessory assembly of the foregoing which is of relatively simple construction and in which the various parts are capable of easy and quick assembly and one which can be attached to or removed from its supporting surface with ease and facility.

It is a still further object of the invention to provide an accessory assembly of the foregoing character which is inexpensive to manufacture but at the same time is pleasingly ornamental in appearance.

Other objects of this invention will appear in the following description and appended claims, reference being had to the accompanying drawings forming a part of this specification wherein like reference characters designate corresponding parts in the several views.

Fig. 1 is a fragmentary view in perspective showing the rear interior of a vehicle body of the enclosed type embodying one form of the present invention.

Fig. 2 is a perspective view of one embodiment of the present invention in its assembled form.

Fig. 3 is an exploded view in perspective, showing the various elements of the present invention and indicating the manner in which they fit together on assembly.

Fig. 4 is a horizontal section taken through lines 4—4 of Fig. 2 looking in the direction of the arrows, the concealed portions being indicated by the dotted lines, and parts being broken away to show the structure adapted to removably maintain the receptacle element in place.

Fig. 5 is a vertical section taken through lines 5—5 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the embodiment of the invention shown therein comprises a lamp, receptacle and lighter assembly shown as a whole at 7 when mounted on the rear face 8 of a front seat of an enclosed automobile body, as illustrated in Fig. 1. However, the assembly may be mounted at other suitable or convenient places and in some instances may be constructed without the lighter unit, that is as a combination lamp and ash tray assembly. The accessory assembly 7 comprises generally four principal elements, namely, a main casing or body portion 9, a hollow tubular lighter receptacle or socket 10, an ash receptacle 11, and a lighter element 12, as best illustrated in Fig. 3.

The main casing or body 9 resembles in its general shape a three dimensioned triangular shell, the rear edges and end walls of which are so inclined that they correspond to the angle of inclination of the back seat 8, thereby positioning the front face of the casing 9 and consequently the entire accessory in substantially a vertical plane. The casing 9 possesses in its outer face a relatively high and wide inwardly extending enclosed recessed portion or chamber 13 and a considerably narrower cut out portion or window 14 (Fig. 5) directly thereover, which is, however, substantially coextensive with the recess 13 in width.

It will be observed that such a structure creates two relatively narrow bridging braces 15 and 16 spanning the width of the body or casing 9, which braces also form, respectively, the outer extremity of the top of the recessed portion 13 and that of the apex portion of the triangular casing 9 as particularly depicted in Figs. 3 and 5. It will also be observed that the brace 16 and, consequently, the top portion of the casing or frame 9 is rounded transversely rather than coming to a sharply angled apex and is slightly arched longitudinally as well.

The braces 15 and 16 also serve to support and enclose a translucent pane or panel 17, or other light transmitting medium which is inserted between and within them and serving to close the window or opening 14. This panel 17 may be held in place by overlapping edge portions, as shown in Fig. 5, and thus be removable. It may, however, be mounted in any other suitable manner.

Immediately behind the translucent pane 17 and fastened to the upper face of the top wall of the recess 13 by means of an angle bracket 18 is a lamp socket 19 carrying a lamp or light bulb 20. The socket and bulb may be of any suitable conventional type and construction. The end of the bulb 20 contacts a clip or contact member 21 in the conventional manner to provide one electrical contact. The lamp unit is provided with the usual electrical conductors 22, the storage battery of the vehicle being utilized as the source of electric current for activating the lamp when the circuit is closed. The circuit is controlled by means of a switch 23 which is also of conventional construction and in the present instance is of the toggle type having a movable handle or control lever 24 extending through a substantially vertical slot 25 in a hollow boss 26 pressed out from the metal of the casing 9 near the center of the cross piece 16 thereof. It will be observed that the angle bracket 18 is provided with suitable openings into which the lamp socket 19 and switch 23 are inserted and thus supported and retained in position in the rear of the translucent pane 17.

The bottom wall of the chamber or recess 13 is pressed to provide a boss 27 forming a substantially semi-circular depression 28 running transversely from front to rear of the chamber 13. The tubular lighter receptacle or socket 10 which is in the form of a hollow cylinder fits within the depression 20 and is secured to the casing 9 in any suitable manner. This tubular member 10 is adapted to receive the lighter element 12. The lighter assembly 10 and 12 including its electrical connections may be of any conventional type; but in the present instance a lighter unit conventionally known as the timed pop-out type is illustrated generally in the drawings. However, since the construction of this unit is conventional and in itself forms no part of the present invention, a detailed description thereof is thought to be unnecessary.

The ash receptacle 11, which is of generally rectangular construction, is designed and dimensioned to provide a sliding fit within the chamber 13 of the casing 9 when placed therein, but is somewhat wider than the said chamber; consequently projecting therefrom on assembly as shown in Fig. 5. The receptacle 11 is provided at its opposite side walls with lugs or projections 29 which are preferably pressed out of the metal, as shown, but may be formed in any suitable way. These lugs 29 are cam-shaped so as to releasably engage yieldable spring locking members 30 mounted upon the inner side walls of the recess 13. The ash receptacle is thus releasably held in position within the recess 13 of the main casing 9 through the cooperation and interlocking of the members 29 and 30. The front and rear walls of the receptacle 11 are connected together at, or near, their upper portions by suitably spaced parallel cross braces 34 which serve the additional function of providing a support or rest for a cigarette, a cigar, or the like. It will be noted that the front wall of the receptacle 11 is crowned or bowed so as to extend outwardly from the front face of the casing 9. Moreover, the depth of the receptacle 11 is materially less than the height of the recess 13 so that upon the installation of the ash receptacle within the casing 9, an opening of substantial depth is provided between the upper edge of the receptacle 11 and the top wall of the recess 13, thus facilitating access to the receptacle when it is positioned within the casing, as shown in Figs. 2 and 5.

It will be seen that the ash receptacle 11 is formed with an arch or tunnel-like passage 31 which is dimensioned to fit over the tubular member 10. As this passage 31 extends from front to rear of the ash receptacle 11 the receptacle when inserted within the recess 13 of the casing will straddle the member 10 and will permit the element 12 to be inserted in or to be removed from the receptacle or socket 10 without interfering with or disturbing the position of the ash receptacle. The cigar or cigarette lighter element 12 has secured to the outer end thereof a plate 32 adapted to fit within the front opening of the passage 31 when the lighting element 12 is inserted within the socket or receptacle 10. Thus, the plate 32 not only forms a relatively snug closure for the front end of the passage 31, but extends downwardly below the ash receptacle 11, the depending extension thereof covering and concealing the boss 27 formed in the bottom wall of the casing 9 as shown in Fig. 5. The portion of the closure plate 29 which extends below the ash receptacle provides a convenient handgrip by means of which the lighter element 12 may be removed from the socket 10 for use in lighting a cigar or cigarette.

The assembly of the foregoing elements to form my completed and positioned accessory takes place as follows: The body portion 9 is secured to a selected portion of a supporting surface upon which it is desired to locate the accessory, preferably on the rear face 8 of the back seat in an automobile body as shown at 7 (Fig. 1). Suitable fastening means such as screws (not shown) are fitted into the countersunk openings 33, 33 in the back wall of the casing 9. These screws are threaded into the supporting surface and secure the body portion 9 thereto.

The receptacle 11 is placed within the body 9, the tunnel 31 therein straddling the tube 10 as described. The receptacle 11 is removable and is maintained in place by engagement of the projections 29 with the spring clips or locking members 30.

The lighter assembly 12 is inserted within the tube 10, the closure section 32 thereof fitting into the frontal opening of the tunnel 31 and extending downwardly as depicted.

The operation and use of the embodiment of the invention shown in the drawings will be readily understood. The light or lamp 20 may be turned on as desired by an occupant of the vehicle by operation of the lever or control handle 24 of the switch 23, the rays of the lamp filament being projected through the window 17 and not only lighting the accessory unit but also the rear compartment of the vehicle. The receptacle 11 contains an open top as shown and is readily and conveniently accessible for the disposal of ashes, refuse, or the other undesired products therein by means of the upper portion of the chamber 13 in the way previously explained. The lighter unit 12 is operated by pressing in the plate 29 thereby creating an electrical contact in the usual way or is operated in some equivalent manner known in the art concerning the particular type of lighting unit selected. In the preferred timed pop-out variety the lighter 12 works automatically and springs outwardly when sufficiently heated for lighting purposes.

From the foregoing it will be understood that I have provided a device which presents for the first time in one assembly, a light source, a receptacle, and preferably a lighter unit as well. By this single assembly I have not only greatly lowered the cost of supplying these accessories within a vehicle body but have made them more conveniently and readily accessible to an occupant thereof.

I claim:

1. An ash receiver comprising a casing having a chamber provided with a front opening, a lighter unit mounted upon the bottom wall of the casing and projecting above the same, and a removable ash receptacle fitting within said chamber and recessed to straddle said lighter unit.

2. An ash receiver comprising a casing having a chamber provided with a front opening, a lighter unit mounted upon the bottom wall of the casing and projecting above the same, and a removable ash receptacle fitting within said chamber and having a transverse tunnel in its base to receive said lighter unit.

3. An ash receiver comprising a casing having a chamber provided with a front opening, a lighter unit mounted upon the bottom wall of the casing and projecting above the same, a removable ash receptacle fitting within said chamber and having a transverse tunnel in its base to receive said lighter unit, said lighter unit having a removable element, and a member carried by said element providing a closure for the front end of said tunnel.

4. An ash receiver comprising a casing having a chamber provided with a front opening, a lighter unit mounted upon the bottom wall of the casing and projecting above the same, a removable ash receptacle fitting within said chamber and having a transverse tunnel in its base to receive the said lighter unit, said lighter unit having a removable element which carries a member that serves as a closure for the front end of said tunnel extending therebelow to provide a handgrip for the lighter unit.

5. A vehicle accessory comprising a casing having a light transmitting facing, a recessed portion therebeneath having a substantially semi-circular depression running transversely across its bottom, a hollow tubular member secured within the depression, a receptacle adapted to fit within the recessed portion provided with a raised portion adapted to fit over said tubular member, and a heat creating lighting element removably inserted within the tubular member.

6. A motor vehicle accessory comprising a casing having an inwardly extending recessed portion and a light transmitting medium integrally associated with its upper portion, a controllable light source situated behind said medium and adapted to illuminate said recessed portion, and a substantially semi-circular depression running transversely across its bottom; an open topped box-like receptacle having a raised arch in registry with the said depression removably maintained within the recess thereby being adapted to be illuminated by said light source; a hollow cylindrical member situated within the opening established by the said registered depression and arch; and a heat creating lighting element rigidly secured to a plate adapted to fit adjacent the frontal opening of the said hollow cylinder, the lighter assembly thus created being removably inserted therewithin.

7. A motor vehicle accessory comprising a casing having a recess in its front face, a lighter unit mounted on the bottom wall of the casing and projecting thereabove, a recessed ash receptacle maintained within the lower portion only of said recess and straddling said lighter unit, said receptacle being accessible through the upper portion of the recess, and means for illuminating said upper portion of the recess for making the receptacle visible, said means comprising a light transmitting pane carried by said casing above and adjacent the top of the recess and an electric lamp mounted on the casing in the rear of said pane.

8. A vehicle accessory comprising a casing having a light transmitting facing, and a recessed portion therebeneath, said recessed portion having a substantially semi-circular depression running transversely across its bottom, a hollow tubular member secured within the depression, an open-topped ash receptacle removably fitted within the lower portion only of said recessed portion, said receptacle being accessible through the open upper part of the recessed portion and having a raised part fitting over said tubular member, a heat creating lighting element removably maintained within the tubular member, and a lamp mounted on said casing behind said light transmitting facing, whereby light transmitted through said facing illuminates the upper part of said recessed portion for making said receptacle visible.

ALVIN W. PRANCE.